United States Patent [19]

Jackson et al.

[11] 4,197,435
[45] Apr. 8, 1980

[54] TELEPHONE LINE MONITORING CIRCUIT AND METHOD

[76] Inventors: Amos R. Jackson, 2887 McClellan St., Salt Lake City, Utah 84106; Thomas C. Jackson, 428 Starcrest, Salt Lake City, Utah 84116

[21] Appl. No.: 880,911

[22] Filed: Feb. 24, 1978

[51] Int. Cl.² .............................................. H04B 3/46
[52] U.S. Cl. ............................................ 179/175.3 R
[58] Field of Search ................ 179/175.2 R, 175.2 C, 179/175, 175.3 R, 175.3 F, 1 C, 2 C; 307/237, 234; 324/52, 95

[56] References Cited

U.S. PATENT DOCUMENTS

| | | | |
|---|---|---|---|
| 3,636,280 | 1/1972 | Wetzel | 179/175.3 R |
| 3,773,986 | 11/1973 | Tremblay | 179/175.3 R |
| 3,919,487 | 11/1975 | Gabrielson | 179/175.3 R |
| 3,941,950 | 3/1976 | Dunwoodie et al. | 179/175 |
| 3,989,908 | 11/1976 | Budrys et al. | 179/175.3 R |
| 4,041,253 | 8/1977 | Altenburger et al. | 179/175.2 R |
| 4,041,255 | 8/1977 | Cambridge et al. | 179/175.3 R |
| 4,051,333 | 9/1977 | Schomburg | 179/175.3 R |
| 4,143,250 | 3/1979 | Simokat | 179/175.3 R |

Primary Examiner—Thomas A. Robinson
Attorney, Agent, or Firm—Victor J. Toth

[57] ABSTRACT

A novel circuit and method are described for monitoring a telephone line of a switched telephone system. The line monitoring circuit is interposed in the telephone system between the local subscriber-line from the central office and the on-premise continuation of that line at the subscriber's location. The line monitoring circuit has component circuitry for sensing both line-to-ground faults and extraneous AC voltages of a predetermined magnitude and frequency. Upon sensing a line-to-ground fault or an extraneous AC voltage of the predetermined magnitude and frequency, a control signal is transmitted to a relay control element which operates to disconnect the on-premise portion of the line from the portion of the line which extends from the subscriber's premise to the central office of the utility company. Visual indicators are also provided with the circuit. The indicators show whether a line-to-ground fault or an extraneous AC voltage fault has caused the relay to operate. The line monitoring circuit also provides a closed loop impedance path which may be used to test the impedance of the central-office line after the line monitoring circuit has operated to disconnect the central-office portion of the system from the on-premise portion.

19 Claims, 3 Drawing Figures

TELEPHONE LINE MONITORING CIRCUIT AND METHOD

BACKGROUND

1. Field of the Invention

The present invention relates to an apparatus and method for detecting and isolating faults on a telephone line system, and more particularly, the invention relates to a novel line monitoring circuit and method for isolating a utility-provided central office line from an on-premise line upon detecting a line-to-ground fault or an extraneous AC voltage fault.

2. The Prior Art

Until recently, all of the equipment used on telephone systems was provided exclusively by closely regulated telephone utilities. However, recent changes in the law now make it possible for customers to provide their own telephones, PBX systems, wiring and the like. Accordingly, privately provided and privately installed subscriber-terminal equipment is fast becoming a major segment of telephone systems.

However, the variety of different devices which are now available for installation at the subscriber terminal of a telephone system has raised some problems. For example, telephone utility companies have raised questions with respect to how their equipment will be protected from faults occurring on the subscriber-terminal portion of the telephone system. These faults may typically occur in the form of either line-to-ground faults or extraneous AC voltages impressed upon the telephone line. Such faults occurring in the equipment or wiring installed on the subscriber-terminal portion of a telephone system may adversely affect the operation of the utility-owned central-office line and may thereby adversely affect other users who are connected to the telephone network.

Furthermore, since the public utility companies are no longer responsible for servicing and maintaining these privately-provided facilities, the question has arisen as to how the customer will know whether a fault or defect has occurred on the utility-provided portion of the line, in which case a serviceman from the utility company should be called, or whether the fault or defect has occurred on the privately-provided facilities, in which case a repairman from the private sector of the industry should be called. Thus, in order to avoid redundant and conflicting calls to both utilities and private servicemen upon the occurrence of a fault, some way is needed to help differentiate, at the subscriber-terminal, between faults which occur on the utility-provided central-office line and those which occur on the privately-provided facilities.

Although there have been some prior attempts to solve these problems, these prior attempted solutions have relied upon telephone line monitoring equipment which must operate and function based upon the sensing of electrical potentials with respect to ground potential at the central office terminal of the telephone system rather than at the subscriber terminal. Accordingly, these prior attempted solutions have not solved the problem of how to differentiate for a customer, when a fault has occurred at the subscriber terminal, what type of fault has occurred and on what portion of the telephone system the fault has occurred (i.e. whether it has occurred on the utility-provided central-office line or whether it has occurred on the privately-provided facilities).

Furthermore, prior attempted solutions to these problems have not provided a sufficiently wide range of capability in terms of protecting against a variety of fault conditions. Typically, a telephone line is comprised of two conductors, one of which is designated a ring conductor, and one of which is designated a tip conductor. Additionally, at the subscriber premise there is provided by the utility company a ground terminal and a grounding conductor. The grounding conductor is typically connected to the water pipe system or to the neutral conductor or ground conductor of the local electrical distribution system. This grounding system provides a path for fault currents caused by lightning or resulting from high-voltage power lines that may fall onto the telephone lines, as during a storm.

Further fault conditions may also occur because of a line-to-ground fault on either of the ring or tip conductors, or through the imposition of extraneous AC voltages on either the tip or ring conductors. These latter mentioned fault conditions are typically sufficiently low that lightning protectors will be ineffective. However, they are nevertheless high enough to pose a hazard to personnel and to damage the facilities of the telephone utility company.

Presently, there is no protective device available in the industry which is capable of protecting against both line-to-ground faults on either of the ring or tip conductors and which can also protect against extraneous, hazardous AC voltages which may be impressed upon the ring or tip conductors through contact with power lines. Furthermore, although there are available high-voltage protective devices that provide protection against extraneous voltages on the order of 300 volts AC and above, the most prevalent potential exposure at the on-premise location is to voltages on the order of 120 volts AC. This 120 volts AC is an extremely hazardous level of voltage, yet there presently is no protective device in the industry that copes with this potential problem.

Accordingly, what is needed is a line monitoring device which may be installed at the subscriber terminal and which can isolate the central-office line from the privately-provided facilities at the subscriber terminal in the event of a line-to-ground fault on either of the ring or tip conductors or in the event of an extraneous AC voltage fault on either conductor. Furthermore, a line monitoring device is needed which is capable of indicating to the customer at the subscriber terminal (1) when a fault has occurred, (2) what type of fault has occurred, and (3) on what portion of the system the fault has occurred (i.e. whether the fault has occurred on the utility-provided central-office line or whether the fault has occurred on the privately-provided facilities at the subscriber terminal).

BRIEF SUMMARY AND OBJECTS OF THE INVENTION

The present invention comprises novel apparatus and method for monitoring a telephone line system and for isolating a central-office line from a privately-provided line at a subscriber terminal upon detection of a line-to-ground fault on either of the ring or tip conductors or upon detection of an extraneous AC voltage between either conductor and ground. The line monitoring circuit and method of the present invention are further designed to indicate at the subscriber terminal (1) when a fault has occurred, (2) what type of fault has occurred, and (3) on what portion of the telephone system the fault has occurred. Apparatus is also provided whereby, upon disconnecting the central-office line from the subscriber's on-premise line, the monitoring circuit enables the central-office line to be tested from a remote location such as the central-office test board of the utility company.

It is, therefore, a primary object of the present invention to provide a novel circuit and method for monitoring a telephone system for line-to-ground faults and extraneous AC voltages and for separating the central-office portion of the line from the subscriber's on-premise line, upon detection of a line-to-ground fault or an extraneous AC voltage fault.

It is another primary object of the present invention to provide for apparatus and method for indicating at the subscriber's premise when the central-office line has been separated from the subscriber's on-premise line.

Another object of the present invention is to indicate at the subscriber premise what type of fault has occurred on the telephone line system.

Yet another object of the present invention is to provide apparatus and method for indicating at the subscriber's premise whether a fault has occurred on the central-office portion of the telephone line system or whether the fault has occurred on the subscriber's on-premise line or the equipment connected at the subscriber location.

A further object of the present invention is to provide apparatus and method whereby the central-office line portion of the telephone system may be tested from a remote, central-office test board for faults up to the point of connection with the subscriber's on-premise facilities.

These and other objects and features of the present invention will become more fully apparent from the following description and appended claims taken in conjunction with the accompanying drawings.

DETAILED DESCRIPTION OF THE PREFERRED EMBODIMENT

Figure 3:
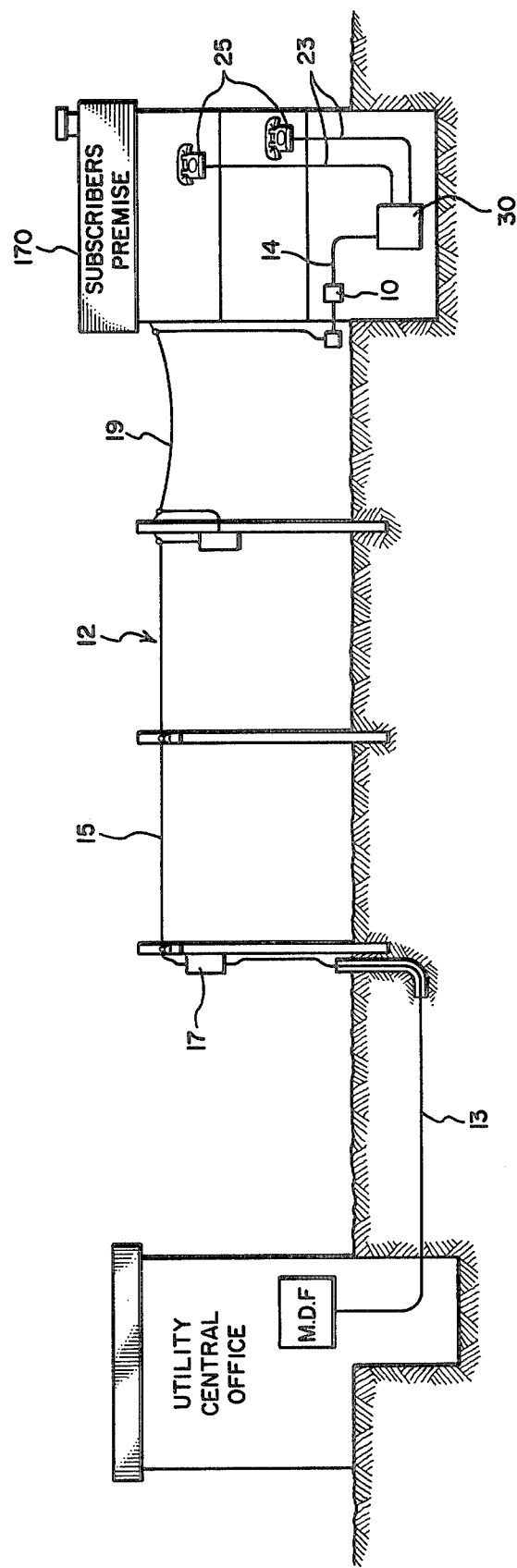
FIG. 3 is a schematic illustration which shows the line monitoring circuit as used in a conventional telephone line system.

Reference is now made to the drawing in which like parts are designated with like numerals throughout. Referring first to FIG. 3, it will be seen that the line monitoring circuit generally designated 10 is adapted to be connected at a subscriber's premise between a utility-provided central-office line generally designated 12 and a privately-provided telephone line 14. Typically, the utility-provided central-office line 12 is a cable having multiple pairs of ring and tip conductors. Central-office line 12 may consist of portions of both underground cable, as at 13, and aerial cable, as at 15. Aerial and underground cables 15 and 13 are suitably connected through an aerial cross-connect box 17, as is conventional. Service wire portion 19 of the utility-provided central-office line 12 connects one pair of ring and tip conductors 16 and 18 (see FIG. 1) to the subscriber's on-premise facilities (such as line 14, terminal equipment 30, extension lines 23 and telephones 25).

Figure 1:
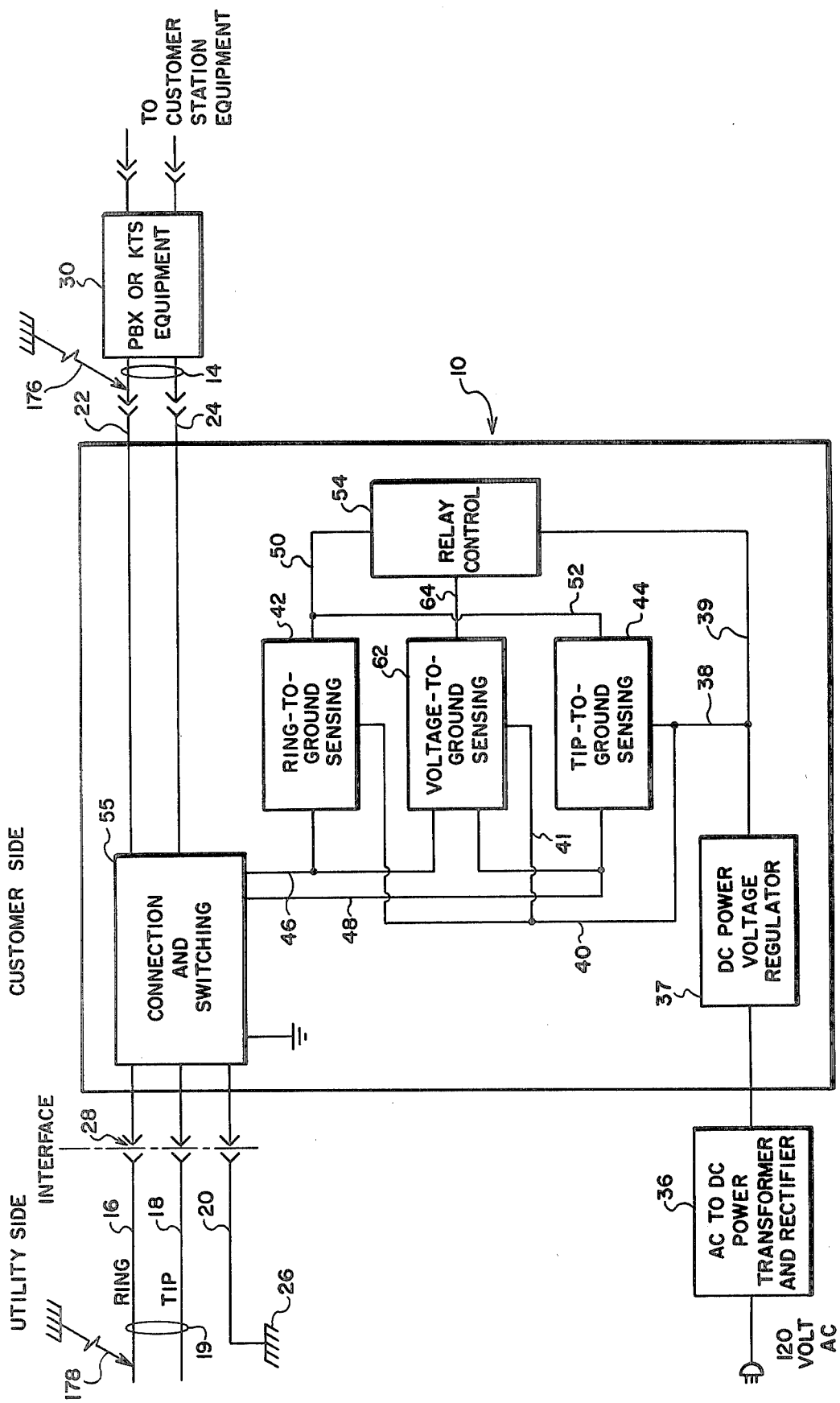
FIG. 1 is a block diagram functionally illustrating the component circuitry of the line monitoring circuit of the present invention.
Figure 2:
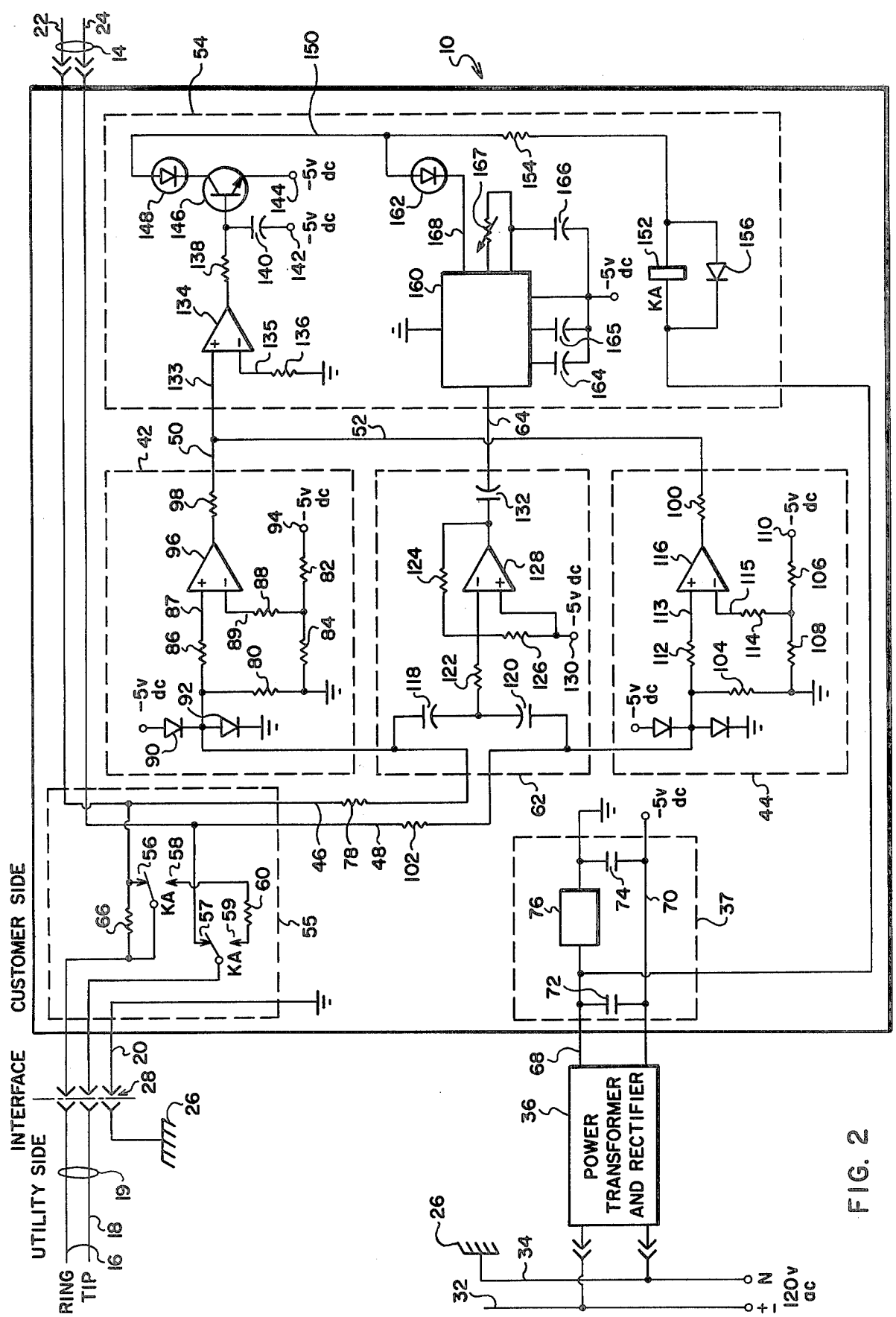
FIG. 2 is a schematic wiring diagram of the line monitoring circuit of the present invention.

As shown in FIGS. 1 and 2, there is also provided a ground conductor 20 which is firmly bonded to an earth ground 26. The privately-provided line 14 likewise has conductors 22 and 24 which are interconnected with and correspond to the ring conductor 16 and tip conductor 18 of the central-office's service line 19. The privately-provided telephone line 14 is adapted to be connected to the central office's service line 19 through a jack generally designated 28. Jack 28 typically is provided at the interface between the utility-provided and the customer-provided facilities. Typically, the privately-provided telephone line 14 connects to a PBX or key system represented schematically at 30. Telephone line 14 may be switched to service any number of individual telephone extensions 23 (see FIG. 3).

With continued reference to FIG. 1, power is supplied to the line monitoring circuit 10 through a conventional 120 volt AC source, illustrated by lines 32 and 34 (see FIG. 2). An AC-to-DC power transformer and rectifier 36 is plugged into the 120 volt power source. The output of transformer and rectifier 36 is then regulated by a DC regulator element 37. The transformer 36 and regulator element 37 provide a −5 volt DC reference voltage. The −5 volt DC reference voltage is transmitted through lines 38–41 to each of the other elements of the line monitoring circuit 10 as will hereinafter be more fully described.

With further reference to FIG. 1, line-to-ground faults are sensed on both the ring and tip conductors by ring-to-ground sensing element 42 and by tip-to-ground sensing element 44. Ring-to-ground sensing element 42 is connected to ring conductor 16 through wire 46 and tip-to-ground sensing element 44 is connected to tip conductor 18 through wire 48. The output of tip-to-ground sensing element 44 is connected to the output of ring-to-ground sensing element 42 as illustrated schematically by lines 50 and 52. As will hereinafter be more fully described, the combined output of elements 42 and 44 changes state from a low level to a high level whenever a line-to-ground fault of a predetermined magnitude is detected on either the ring conductor 16 of the tip conductor 18.

When the combined output of elements 42 and 44 is high due to a detected line-to-ground fault, relay control element 54 receives a status signal. As described further below, when relay control element 54 receives a status signal, connection and switching element 55 is operated so as to separate ring and tip conductors 16 and 18 of the utility-provided service line 19 from conductors 22 and 24 of the privately-provided on-premise line 14. Connection and switching element 55 also operates to provide a closed loop impedance path which permits the central-office line 12 to be tested for faults up to the point of interface between the utility and subscriber, at jack 28.

As will be hereinafter more fully described, relay control element 54 also includes apparatus for indicating (1) when a fault has occurred, (2) what type of fault has occurred and (3) on what portion of the line the fault has occurred. Significantly, this permits a customer to readily detect the occurrence of a fault and whether the fault has occurred on the utility-provided central-office line or on his own privately-provided on-premise line 14. The customer thus knows whether he should call the utility company for repair service or whether he should call a repairman from the private sector of the industry. Furthermore, if the fault has occurred on the utility's line 12, the utility company may conveniently perform tests on line 12 from its central office up to the point of interface at jack 28.

Voltage-to-ground sensing element 62 is also connected to ring and tip conductors 16 and 18 through wires 46 and 48. Upon sensing an extraneous AC voltage-to-ground of predetermined magnitude and frequency on either of the ring or tip conductors 16 and 18, a status signal is transmitted on wire 64 to relay control element 54. Relay control element 54 thereafter causes connection and switching element 55 to operate in the manner described previously so as to disconnect the privately-provided on-premise line 14 from the utility-provided service line 19 and so as to provide a closed loop impedance path for purposes of testing the utility's line 12.

Reference is now made to the schematic wiring diagram shown in FIG. 2. Each of the functional circuit elements 37, 42, 44, 54, 55 and 62 of FIG. 1 are indicated in FIG. 2 by broken line boxes correspondingly numbered. For convenience in describing the circuit schematic of FIG. 2, representative values for the individual elements of each functional element are set forth in Table A at the end of the detailed description of the preferred embodiment of the invention.

With continued reference to the circuit embodiment of FIG. 2, a regulated DC voltage source is employed as the power supply for the line monitoring circuit 10. The reference voltage of the DC source is −5 volts and is determined by the characteristics of the solid state devices used in the line monitoring circuit 10 and by the local power source of 120 volts AC with respect to earth ground 26. Essentially this same earth ground potential, accessed at the utility central office, regulates the operating voltage levels of the ring and tip conductors 16 and 18. Clearly, any suitable DC power supply could be used in conjunction with the line monitoring circuit 10 of the present invention.

In the illustrated embodiment, a conventional AC to DC power transformer and rectifier 36 is plugged into a 120 volt AC source, illustrated by wires 32 and 34. Transformer and rectifier 36 provides a 6 volt DC, 55 milliamp output. The output of transformer and rectifier 36 is fed through wires 68 and 70 to capacitors 72, 74 and to integrated circuit 76. The capacitors 72, 74 and integrated circuit 76 regulate the output of transformer 36 to provide the −5 volt DC reference voltage.

Since each of the components of ring-to-ground sensing element 42 and tip-to-ground sensing element 44 are essentially identical, for purposes of convenience, only the components of element 42 will be described. It will thus be understood that tip-to-ground sensing element 44 is constructed in essentially an identical manner.

Line-to-ground faults occurring on ring conductor 16 produce a change in the DC voltage level of conductor 16. This voltage change is detected and transmitted through wire 46 to resistors 78 and 80. Resistors 78 and 80 act as a voltage divider for purposes of reducing the detected voltage change to an appropriate level. Diodes 90 and 92 function to protect the DC power source from other voltages. Diode 90 serves as a high impedance barrier to over-voltages while diode 92 acts as a low impedance path to ground for such over-voltages.

The voltage level detected on ring conductor 16, reduced by the characteristics of resistors 78 and 80, is then fed as the input on the noninverting terminal 87 of operational amplifier 96. Resistor 86 permits the the appropriate biasing characteristics to be achieved. Resistors 82 and 84 serve as a voltage divider for the regulated reference signal of −5 volts DC, which appears at terminal 94. The reference signal is then fed as the input on the inverting terminal 89 of the operational amplifier 96, and appropriate biasing characteristics are achieved through the resistor 88.

The output voltage signal from operational amplifier 96 appears across resistor 98. As will be hereinafter more fully described in connection with the description of the method, when the detected signal input through the noninverting terminal 87 of operational amplifier 96 is greater than or equal to the constant reference signal input through the inverting terminal 89, the output voltage appearing at resistor 98 will change from a low level (−5 volts DC) to a high level (0 volts). In like manner, when the detected voltage level which is the input on the noninverting terminal 113 of operational amplifier 116 is greater than or equal to the constant reference signal input through the inverting terminal 115, the output appearing at resistor 100 will change from a low lever (−5 volts DC) to a high level (0 volts DC). When the output of either operational amplifier 96 or 116 is high due to the presence of a detected line-to-ground fault on either of the ring or tip conductors 16 and 18, a status signal is sent on wire 133 to relay control element 54, as more fully described below.

Extraneous AC voltages are detected on the ring and tip conductors 16 and 18 through lines 46 and 48. DC voltages appearing on lines 46 and 48 are blocked by capacitors 118 and 120, and the detected extraneous voltage is reduced to an appropriate level by resistor 78 and capacitor 118 (or alternatively by resistor 102 and capacitor 120) in conjunction with resistor 122. Operational amplifier 128 is powered by the −5 volt DC reference signal appearing at terminal 130 and is properly biased by resistor 126. Resistor 124 controls the gain of operational amplifier 128 and its value is such that operational amplifier 128 will function as a unity gain buffer-amplifier. In this manner, the AC voltage signals appearing at the output of operational amplifier 128 across capacitor 132 will be maintained at an appropriate level for purposes of driving the relay control element 54.

Relay control element 54 is constructed primarily in two sub-stages. One sub-stage is designed to control relay 152 in response to detected line-to-ground faults. The other sub-stage is designed to control relay 152 in response to detected AC voltages appearing between conductors 16 or 18 and earth ground 26. The ground fault control sub-stage consists of operational amplifier 134, resistor 138, capacitor 140, transistor 146 and light emitting diode (LED) 148. The AC voltage control sub-stage consists of an integrated phase-locked loop circuit 160 and LED 162.

When a line-to-ground fault is detected on either of the ring or tip conductors 16 and 18, the combined output of operational amplifiers 96 and 116 will change from a low level of −5 volts DC to a high level of 0 volts, as previously described. This change is detected as a status signal by noninverting terminal 133 of operational amplifier 134. Since inverting terminal 135 is grounded, both terminals 133 and 135 will be at a high level (0 volts) relative to the reference voltage (−5 volts DC). When inputs 133 and 135 are both high, operational amplifier 134 will turn on transistor 146, thereby causing current to flow in line 150.

By properly biasing relay 152 with resistor 154 and diode 156, relay 152 will be energized. When relay 152 is energized, contacts 56 and 57 will be switched so as to separate ring and tip conductors 16 and 18 of the utility-provided service line 19 from conductors 22 and 24 of the subscriber's on-premise line 14. When contacts 56 and 57 are switched so as to separate line 19 from line 14, resistor 60 is shunted across the ring and tip conductors 16 and 18. Resistor 60 thus provides a closed loop impedance path for purposes of testing the utility's central-office line 12. Resistor 66 provides a high impedance path around contact 56 which permits the normal operating voltage to be re-established on ring conductor 16, thus resetting the line monitor circuit 10 after its operation.

Resistor 138 and capacitor 140 are interposed between operational amplifier 134 and transistor 146 in order to delay the response of transistor 146. The values of resistor 138 and capacitor 140 are chosen such that the RC time constant will delay the signal of operational amplifier 134 for a period of time sufficient to permit transient faults to clear before transistor 146 is turned on. When transistor 146 is turned on, LED 148 will visually indicate that a line-to-ground fault has caused the circuit to operate. Although the line monitoring circuit 10 of the present invention could be designed for any desirable level of fault current, the line monitoring circuit 10 has been designed to operate whenever line-to-ground faults of 500 ohms-to-ground or less are detected.

When an AC voltage-to-ground is detected on either of the ring or tip conductors 16 and 18, the voltage is reduced to an appropriate level and buffered by operational amplifier 128, as described above. The buffered signal is then fed as a status input signal through wire 64 to an integrated circuit 160. Integrated circuit 160 is a commercially available circuit chip (see Table A) which provides a phase-locked loop. Integrated phase-locked loop circuit 160 detects input signals of approximately 56 to 64 hertz at levels of 30 millivolts or greater. Capacitors 164–166 and potentiometer 167 are used to set the triggering level and output characteristics of circuit 160. In the illustrated embodiment, the values of capacitors 164–166 and potentiometer 167 are such that whenever AC voltages-to-ground equal to or greater than 12 volts are detected on the ring or tip conductors 16 and 18, the output line 168 of circuit 160 will cause current to be conducted through line 150 and LED 162. Thus, relay 152 will be energized, thereby causing contacts 56 and 57 to disconnect the utility's service line 19 from the subscriber's on-premise line 14 as previously described. LED 162 will be energized indicating that an AC voltage has caused the line monitoring circuit 10 to operate.

Having described the construction of line monitoring circuit 10, reference is now directed to FIGS. 1 and 3 in conjunction with a description of the method of operation of the circuit 10 in a conventional telephone system. As schematically shown in FIG. 3, the line monitoring circuit 10 is mounted inside a home or building 170 on a wall or any similar convenient place near the subscriber terminal jack 28 (FIG. 1). The utility company provides a service line 19 which connects the line monitoring circuit 10 and customer-provided facilities to one pair of ring and tip conductors 16 and 18 of the utility's central-office line 12. AS previously noted, the central-office line 12 is typically a cable which carries multiple pairs of ring and tip conductors.

As described above, elements 42 and 44 change their output levels to a high state whenever the difference between the detected voltage and the reference voltage is greater than or equal to zero. Conventionally, when telephones 25 are not in use (i.e. "on hook"), ring conductor 16 is at −50 volts DC and tip conductor 18 is at ground potential, or 0 volts. If a line-to-ground fault occurs on ring conductor 16 while the telephones 25 are on hook, ring conductor 16 will approach 0 volts. As it does so, the potential of ring conductor 16 will reach a level which will trigger ring-to-ground sensing element 42, causing it to go high, as described above. Since tip conductor 18 is at 0 volts when telephones 25 are on hook, the output of tip-to-ground sensing element 44 will already be high. Thus, the output of both elements 42 and 44 will be high, and relay control element 54 will receive a status signal. When relay control element 54 receives the status signal, the subscriber's on-premise line 14 will be disconnected from the utility's service line 19 in the manner previously described.

Significantly, if the line-to-ground fault occurs on the ring conductor of the customer-provided facilities, as schematically illustrated at 176 (see FIG. 1), line 14 will be permanently disconnected until the fault is cleared and the circuit 10 has been reset through reestablishment of normal operating potentials on line 14. LED 148 (see FIG. 2) will be energized until the circuit 10 is reset, thus indicating that a line-to-ground fault has occurred. If the line-to-ground fault occurs on the ring conductor of the utility-provided facilities, as schematically illustrated at 178 (see FIG. 1), circuit 10 will trip on and off, thus causing LED 148 to flash. In this manner, the customer can readily discern on what portion of the telephone system (i.e. utility-provided or customer-provided) the fault has occurred.

This flashing, or intermittent operation of LED 148 results because the off-premise fault at 178 causes contacts 56 and 57 to open. This, in turn, removes the sensing circuitry from the line where the fault is present, such that relay 152 returns to normal. As soon as relay 152 returns to normal, the sensing circuit again connects to the line in response to the fault which would still be present, and the relay again operates. The frequency of the flashing will depend upon the R/C time characteristics of the sensing circuitry, and thus the rate at which relay 152 intermittently opens and returns to normal. The lamp response in this latter state continues to be one of continued illumination during the period over which contacts 56 and 57 are open, just as if the fault were on the premise side of the line. But because the period of illumination is interrupted as described above, the on and off, or intermittent operation of LED 148 produces a distinct "flashing" in contrast to the continuous illuminated response which results when the fault is on the premise side.

When one of the telephones 25 is in use (i.e. "off hook"), ring conductor 16 is conventionally at approximately −28 volts DC. When off hook, about 200 ohms is placed between the ring and tip conductors 16 and 18. Thus, tip conductor will typically be at about −22 volts DC, thus placing about a −6 volt DC potential across conductors 16 and 18. If a line-to-ground fault thereafter occurs on either of the ring or tip conductors 16 and 18, both conductors will approach zero volts. Thus, both sensing elements 42 and 44 will be triggered, causing relay control element 54 to operate in the manner described above.

After operation of the relay control element 54, a closed loop impedance path is provided by resistor 60, which is shunted across the ring and tip conductors 16 and 18. The utility company may test the closed loop path from its central office to determine the existence of faults on its line 12, up to the point of interface at jack 28.

During either of the on-hook or off-hook states, if an AC voltage-to-ground of the previously described magnitude and frequency appears on ring or tip conductors 16 and 18, element 62 will trigger relay control element 54, as described above. LED 162 (see also FIG. 2) will flash on and off as the circuit 10 trips on and off if the fault is on the utility's line, as at point 178. LED 162 will remain permanently lit if the fault is on the customer's line, as at point 176.

From the foregoing description, it will thus be appreciated that the line monitoring circuit of the present invention advantageously isolates the utility-provided facilities from a customer's facilities upon detection of line-to-ground or AC voltage faults occurring on either of the ring or tip conductors. Furthermore, the type and location of the fault are conveniently indicated for the customer so that he can quickly contact the proper repairman or the utility company.

TABLE A

| Component | Representative Value or Product No. & Manufacturer |
|---|---|
| Resistors* | |
| 60 | 680 ohms, 2 watt |
| 66 | 2 megohms |
| 78, 102 | 10 megohms |
| 80, 86, 88, 104, 112, 114 | 1 megohm |
| 82, 106, 136 | 100 kilohms |
| 84, 98, 100 | 120 kilohms |
| 108 | 75 kilohms |
| 122, 124 | 470 kilohms |
| 126 | 220 kilohms |
| 138 | 4.7 kilohms |
| 154 | 47 ohms |
| 167 | 0 to 25 kilohms |
| *All resistors are ¼ watt unless otherwise noted. | |
| Capacitors* | |
| 72, 164 | 470 microfarads |
| 74, 165, 140 | 220 microfarads |
| 118, 120 | 0.005 microfarad |
| 131 | 0.1 microfarad |
| 166 | 1.0 microfarad |
| *All capacitors are 100 volt. | |
| All diodes | IN914 (ITT) |
| All operational Amplifiers | LM 3900 (National Semiconductor) |
| All Transistors | MPS 6554 (Motorola) |
| All LEDs | CM4-50A (Newark Electronics) |
| Relay 152 | 4PDT, 6 volt coil 70R4-60C-SCO (Sigma) |
| Integrated Circuits | |
| 160 | NE 567 (Signetics) |
| 76 | LM 309 (Signetics) |

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A telephone system comprising in combination:
   a utility-provided central-office line;
   at least one subscriber terminal connected to said central-office line;
   a privately-provided on-premise line together with privately-provided telephone equipment connected to said central-office line through said subscriber terminal; and
   monitoring means for detecting faults on either of said central-office or on-premise lines, said monitoring means being interposed between said central-office line and said on-premise line and comprising:
   means for indicating at the subscriber terminal when a fault has occurred on either of said on-premise or central-office lines; and
   means for disconnecting said central-office line from said on-premise line upon detecting a fault on either of said central-office or on-premise lines.

2. In a telephone system having a utility-provided central-office line comprising a ring conductor and a tip conductor and said system further having a privately-provided on-premise line connected at a subscriber terminal to said central-office line, a line monitoring circuit interposed between said central-office line and said subscriber's on-premise line, said circuit comprising:
   a power supply;
   sensing means, connected to said power supply and to said ring and tip conductors, for detecting the presence of line-to-ground faults of a predetermined magnitude and for producing a signal upon detection of any line-to-ground fault of the predetermined magnitude;
   disconnecting means, connected to said power supply and responsive to the signal generated by said sensing means, for separating the central-office line from the subscriber's on-premise line upon occurrence of a fault; and
   means for indicating at the subscriber's premise when said disconnecting means have operated.

3. In a telephone system having a utility-provided central-office line comprising a ring conductor and a tip conductor and said system further having a privately-provided on-premise line connected at a subscriber terminal to said central-office line, a line monitoring circuit interposed between said central-office line and said subscriber's on-premise line, said circuit comprising:
   a power supply;
   sensing means, connected to said power supply and to said ring and tip conductors, for detecting the presence of AC voltages of a predetermined magnitude and frequency and for producing a signal upon detection of any AC voltage of the predetermined magnitude and frequency;
   disconnecting means, connected to said power supply and responsive to the signal generated by said sensing means, for separating the central-office line from the subscriber's on-premise line upon occurrence of an AC voltage fault of the predetermined magnitude and frequency; and
   means for indicating at the subscriber's premise when said disconnecting means have operated.

4. A telephone line monitoring circuit comprising:
   a power supply;
   first sensing means, connected to said telephone line and said power supply, for monitoring the telephone line for line-to-ground faults of a predetermined magnitude and for producing a signal upon detection of a line-to-ground fault of the predetermined magnitude;

second sensing means, connected to said telephone line and said power supply, for monitoring the telephone line for AC voltage of a predetermined magnitude and frequency and for producing a signal upon detection of AC voltage of the predetermined magnitude and frequency; and disconnecting means, connected to said power supply and responsive to the signal generated by either of said first and second sensing means, for disabling the telephone line.

5. In a telephone system having a utility-provided central-office line comprising a ring conductor and a tip conductor and said system further having a privately-provided on-premise line connected at a subscriber terminal to said central-office line, a line monitoring circuit interposed between said central-office line and said subscriber's on-premise line, said circuit comprising:

a regulated power supply;

first sensing means, connected to said ring conductor and to said power supply, for detecting ring-to-ground faults of a predetermined magnitude and for generating a signal in response to a detected fault of the predetermined magnitude;

second sensing means, connected to said tip conductor and to said power supply, for detecting tip-to-ground faults of a predetermined magnitude and for generating a signal in response to a detected fault of the predetermined magnitude;

third sensing means, connected to the ring and tip conductors and to said power supply, for detecting AC voltages of a predetermined magnitude and frequency and for generating a signal in response to a detected AC voltage of the predetermined magnitude and frequency;

disconnecting means, connected to said power supply and responsive to the signal generated by either of said first, second or third sensing means, for separating said on-premise line from the central-office line whenever a ground fault or AC voltage of the predetermined magnitude is sensed;

means for indicating at the subscriber's premise (1) when said disconnecting means have operated and (2) whether the operation was due to a line-to-ground fault or an extraneous AC voltage; and means for providing a closed loop impedance path through said ring and tip conductors up to the point of connection between the central-office line and said subscriber's on-premise line, thereby enabling said central-office line to be tested from a remote utility-owned central office.

6. The line monitoring circuit of claim 5 wherein each of said first and second sensing means comprise an operational amplifier which compares the DC voltage level on the ring and tip conductors with a regulated DC voltage from the power supply, said amplifiers changing state from a low level output to a high level output whenever a line-to-ground fault is detected which is of the predetermined magnitude.

7. The line monitoring circuit of claim 5 wherein said third sensing means comprises an operational amplifier having unity gain so as to buffer the detected AC voltage.

8. The line monitoring circuit of claim 5 wherein said disconnecting means comprises:

a relay;

a set of normally closed contacts which are opened whenever said relay is energized, thereby disconnecting said ring and tip conductors of the central-office line from the on-premise line;

a ground fault sub-stage for energizing said relay upon detection by either of said first and second sensing means of a line-to-ground fault of the predetermined magnitude, said ground fault sub-stage comprising an operational amplifier triggered by the signals of said first and second sensing means, and a transistor which conducts current so as to energize said relay when said operational amplifier is triggered; and an AC voltage sub-stage for energizing said relay upon detection by said third sensing means of an AC voltage of the predetermined magnitude and frequency, said AC voltage sub-stage comprising an integrated phase-locked loop circuit which is triggered by said third sensing means, thereby causing current to be conducted through said relay to energize the relay.

9. A line monitoring circuit as defined in claim 5, further comprising reset means for permitting proper operating conditions to be re-established on said ring and tip conductors after said monitoring circuit has cleared a line-to-ground fault or an extraneous AC voltage, thus reconnecting said on-premise line to the central-office line.

10. A line monitoring circuit as defined in claim 5, further comprising override means for delaying the operation of said disconnecting means during transient faults of a predetermined time period.

11. A line monitoring circuit as defined in claim 5, further comprising means for indicating at the subscriber's premise whether a detected tip-to-ground fault or AC voltage fault is on the central-office line or on the on-premise line.

12. A line monitoring circuit as defined in claim 5, further comprising means for protecting said power supply from over voltages.

13. In a telephone system having a utility-provided central-office line comprising a ring conductor and a tip conductor and said system further having a privately-provided on-premise line connected at a subscriber terminal to said central-office line, a line monitoring circuit interposed between said central-office line and said subscriber's on-premise line, said circuit comprising:

a regulated DC power supply;

a relay;

a set of normally closed contacts which are opened whenever said relay is energized, thereby disconnecting said central-office line from said on-premise line;

a first operational amplifier, connected to said DC supply and to said ring conductor, for detecting ring-to-ground faults of a predetermined magnitude;

a second operational amplifier, connected to said DC supply and to said tip conductor, for detecting tip-to-ground faults of a predetermined magnitude;

a third operational amplifier, connected to ground and to the outputs of said first and second operational amplifiers, for changing state whenever either of said first and second operational amplifiers detect a line-to-ground fault of the predetermined magnitude;

an RC time delay stage, connected to the output of said third operational amplifier, for enabling said relay to ride through transient faults without operating;

a transistor, connected to said RC stage, for driving said relay in response to a change of state by said third operational amplifier;

a light emitting diode, connected to the collector terminal of said transistor, for visually indicating the operation of said relay due to a line-to-ground fault;

a fourth operational amplifier, connected to said DC supply and to said ring and tip conductors, for detecting extraneous AC voltages of predetermined magnitude and frequency;

an integrated phase-locked loop circuit, connected to the output of said fourth operational amplifier and to said DC supply, for driving said relay whenever an extraneous AC voltage of the predetermined magnitude and frequency is detected between either of said ring or tip conductors and ground;

a light emitting diode, connected to the output of said phase-locked loop circuit, for visually indicating the operation of said relay due to an extraneous AC voltage; and a high impedance resistor connected across the normally closed contact on said ring conductor, for enabling normal operating conditions to be reestablished after operation of said relay.

14. A line monitoring circuit as defined in claim 13, further comprising a fixed-value resistor shunted between said ring and tip conductors through a pair of normally open contacts, said normally open contacts closing whenever said relay is energized, shunting said fixed-value resistor across said ring and tip conductors.

15. A line monitoring circuit as defined in claim 14, further comprising two pairs of diodes, each diode pair being interposed between one of said ring and tip conductors and said power supply so as to protect said power supply from over voltage by providing a low impedance path to ground.

16. In a telephone system having a utility-provided central-office line and a privately-provided on-premise line connected at a subscriber terminal to said central-office line, a method of protecting said telephone system from abnormal current and voltage conditions, the method comprising the steps of:

simultaneously monitoring said central-office and on-premise lines for both line-to-ground faults and AC voltages of a predetermined magnitude and frequency;

generating a signal in response to a detected line-to-ground fault or AC voltage of the predetermined magnitude and frequency;

disconnecting said on-premise line from said central-office line in response to said signal;

indicating at the subscriber terminal (1) when said disconnection has occurred and (2) whether said disconnection was due to a line-to-ground fault or an AC voltage; and providing a closed loop impedance path up to the subscriber terminal which may be tested from a central utility-owned office.

17. A method of protecting a telephone line system from ground faults and extraneous AC voltages with a line monitoring circuit, the circuit having a regulated DC power supply, a line-to-ground sensing element, an AC voltage sensing element, and a connection and switching element, said telephone line system having a utility-provided central-office line with a ring conductor and a tip conductor, and a privately-provided on-premise line connected at a subscriber terminal to the central-office line, the method comprising the steps of:

generating a reference signal with said power supply;

monitoring said ring and tip conductors with said line-to-ground sensing and said AC voltage sensing elements;

comparing said reference signal with any line-to-ground sensing and said AC voltage sensing components;

comparing said reference signal with any line-to-ground fault sensed on the ring or tip conductors by the line-to-ground sensing element;

generating a first status signal whenever the difference between said reference signal and said detected line-to-ground fault reaches a predetermined level;

generating a second status signal whenever an AC voltage of a predetermined magnitude and frequency is sensed on the ring or tip conductors by said AC voltage sensing element;

operating said connection and switching element in response to either of said first and second status signals, thereby disconnecting said on-premise line from the central-office line;

indicating at the subscriber terminal (1) when said disconnection has occurred and (2) whether said disconnection was due to a line-to-ground fault or an AC voltage fault; and providing a closed loop impedance path through said ring and tip conductors up to the subscriber terminal which may be tested from a remote utility-owned central office.

18. A method as defined in claim 17, further comprising the step of indicating at said subscriber's premise whether said line-to-ground fault or AC voltage fault is on the central-office portion or on-premise portion of said telephone line system.

19. A method as defined in claim 17, further comprising the step of resetting said disconnect mechanism after it has operated in response to one of said first and second status signals.

* * * * *